Nov. 20, 1923.
E. H. WINGQVIST
1,474,500
METHOD OF MANUFACTURING GEAR WHEELS
Filed Oct. 22, 1920
Old practice Fig. 1.
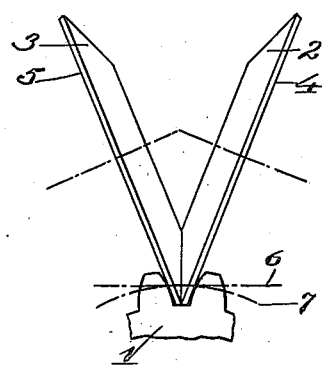
Fig. 2.
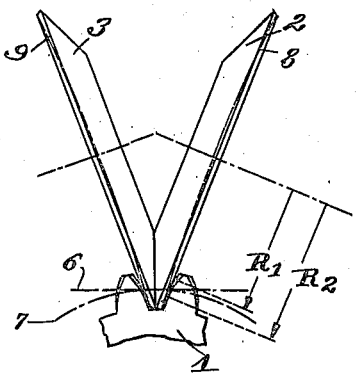
Fig. 3.
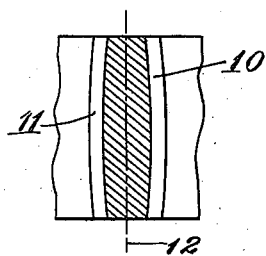
Fig. 4.
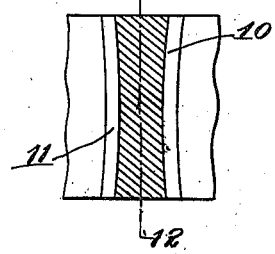
INVENTOR.
Erik H. Wingqvist
BY
Roger Kennedy & Campbell
ATTORNEYS.

Patented Nov. 20, 1923.

1,474,500

UNITED STATES PATENT OFFICE.

ERIK HJALMAR WINGQVIST, OF UTBYNAS VILLASTAD, NEAR GOTTENBORG, SWEDEN, ASSIGNOR TO AKTIEBOLAGET SVENSKA KULLAGERFABRIKEN, OF GOTTENBORG, SWEDEN, A CORPORATION OF SWEDEN.

METHOD OF MANUFACTURING GEAR WHEELS.

Application filed October 22, 1920. Serial No. 418,825.

*To all whom it may concern:*

Be it known that I, ERIK HJALMAR WING-QVIST, a subject of the King of Sweden, residing at Utbynas Villastad, near Gottenborg, in the Kingdom of Sweden, have invented an Improved Method of Manufacturing Gear Wheels, of which the following is a specification, reference being had to the drawing accompanying and forming a part thereof.

This invention relates to gear wheels, either spur or bevel, having straight or skew teeth, and in which the side surfaces of each tooth are oppositely curved with relation to the longitudinal central plane of the tooth, counted in the longitudinal direction thereof. As well known in the art, the object of such an arrangement is to reduce the danger of a breakage, inasmuch as the working pressure will act on the tooth, even in the case of an inaccurate mounting of two cooperating wheels, substantially at or near the middle of each tooth and not at any of the ends thereof, where the moment of resistance is the least and, thus, the danger of breakage is the greatest.

The object of the invention is to facilitate the manufacturing of gear wheels of this kind and to provide an ideal tooth so that the engagement will be smooth and the working will be noiseless and thrust-free.

The invention consists, substantially, in the longitudinally curved toothed sides being formed according to the rolling principle. The manufacturing can suitably be performed by means of two rotary cutting or grinding tools whose axes are placed at an angle to each other and whose working surfaces form conical surfaces.

In the drawing, Fig. 1 shows, schematically, a known method of manufacturing gear wheels. Fig. 2 shows, schematically, a method of manufacturing gear wheels according to the invention. Fig. 3 is a longitudinal section of a tooth of a spur wheel manufactured according to the method illustrated in Fig. 2, or according to any method based on the rolling principle. Fig. 4 is a longitudinal section of a modified tooth according to the invention.

It is well known that spur wheels and bevel wheels having straight or skew teeth can be manufactured, according to the rolling principle, by means of rotary cutting or grinding tools having plane working surfaces. In Fig. 1, this method is shown applied to the manufacturing of a spur wheel.

According to Fig. 1, the tooth sides are formed in a blank 1 by means of two rotary tools 2 and 3 having plane working surfaces placed at an angle to each other corresponding to twice the pressure angle. The tooth spaces are produced by causing the wheel blank to rotate about its axis, at the same time causing the rotary tools 2 and 3 to move in the direction of the tangent 6 of the pitch circle 7 with a speed equal to that of a point of the said circle. The working parts of the tools 2 and 3 form together a tooth of an imagined generating rack, the tooth spaces being thus formed according to the rolling principle.

Also in producing spur wheels according to the present invention, two rotary tools 2 and 3 (Fig. 2) are used, the relative movement of the tools and the wheel blank 1 being the same as in the method just described, the working surfaces 8 and 9 of said tools being, however, conical in shape, instead of plane, with the result that the tooth sides 10, 11 will obtain the curved form shown in Fig. 3. Since the radius $R_1$ of the portion of the conical working surface finishing the portion of the tooth side next to the top of the tooth is, obviously, less than for instance the radius $R_2$ of the portion of the conical working surface finishing the portion of the tooth side adjacent to the bottom of the tooth space, it appears that the tooth side will obtain a radius of curvature gradually increasing from the top toward the root of the tooth, counted in the longitudinal direction thereof. On account hereof, the length of contact of two cooperating teeth will gradually increase toward the roots of the teeth, in moving inward, and gradually decrease toward the tops of the teeth, in moving outward, by which the engagement will be smooth and the working will be noiseless and thrust-free.

The manufacturing of bevel wheels can be performed in a manner analogous to that described. In this case, however, the tools 2, 3 do not move rectilinearly, but are caused to swing relatively to the wheel blank about the axis of the generating wheel.

As shown in Fig. 2, the conical working surfaces 8, 9 turn their apices toward each other, and, as a consequence, the tooth sides 10, 11 generated will obtain a convex form, as shown in Fig. 3. If, on the contrary, the working surfaces 8, 9 are arranged so as to turn their apices away from each other, the tooth sides generated will be concave, as shown in Fig. 4.

It is obvious that, on certain conditions, a wheel having teeth according to Fig. 4 can co-operate with a wheel having teeth according to Fig. 3. If desired, the radius of curvature of the convex tooth side, Fig. 3, can be made less than that of the concave tooth side, Fig. 4, so that the engagement will commence at or near the middle of the teeth.

The invention comprises spur wheels and bevel wheels having straight teeth, or skew, or twisted teeth, and the manufacturing of the wheels can also be performed for instance by a rolling process in any known or convenient manner.

I claim:

1. The method of shaping the teeth of gear wheels, which consists in rotating the wheel blank on its axis, and presenting the side of the tooth to the action of a conical rotary shaping surface, while moving the said surface bodily relatively to the wheel.

2. The method of shaping the teeth of gear wheels, which consists in rotating the wheel blank on its axis, and presenting the side of the tooth to the action of a conical rotary shaping surface, while moving said surface bodily in a rectilinear path.

3. The method of shaping the teeth of gear wheels, which consists in rotating the wheel blank on its axis, and presenting the sides of the tooth to the action of conical shaping surfaces rotating about axes forming an angle with respect to each other, while moving said shaping surfaces bodily relatively to the wheel.

In testimony whereof I have signed my name.

ERIK HJALMAR WINGQVIST.